C. D. MACROPOULOS.
ROTARY RECTIFIER OF ALTERNATING CURRENTS.
APPLICATION FILED SEPT. 23, 1918.
1,302,945.  Patented May 6, 1919.
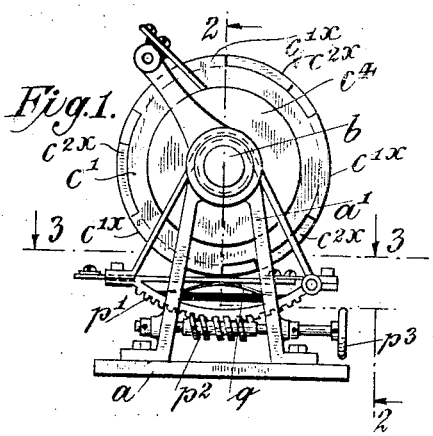
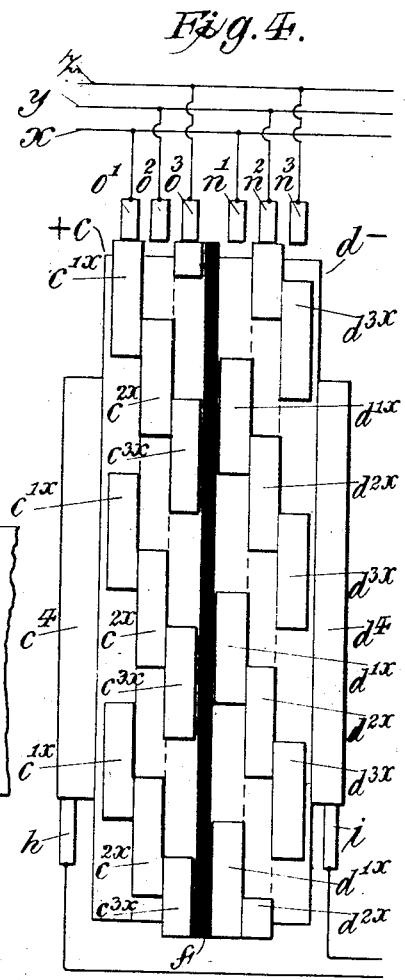
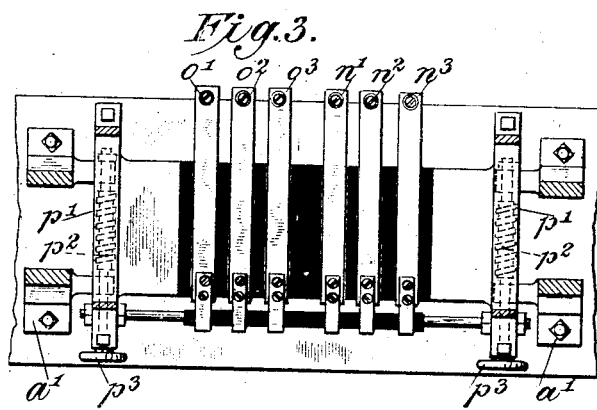
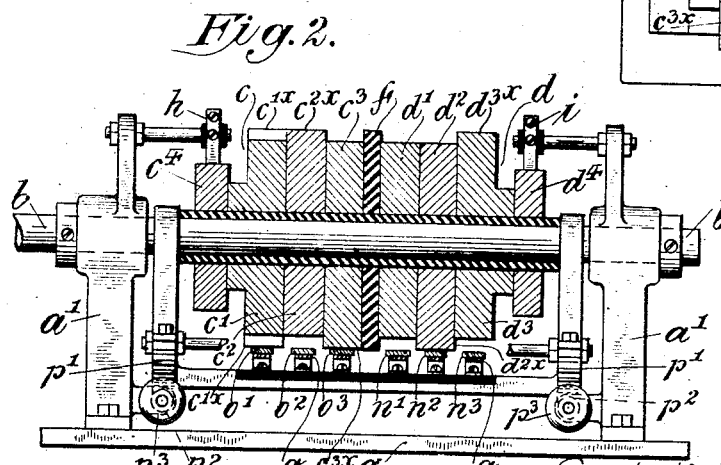
INVENTOR
Constantine D. Macropoulos
BY
Redding, Greeley & Goodlett
ATTORNEYS
WITNESS
Geo. Schwarz.

UNITED STATES PATENT OFFICE.

CONSTANTINE D. MACROPOULOS, OF NEW YORK, N. Y.

ROTARY RECTIFIER OF ALTERNATING CURRENTS.

1,302,945.  Specification of Letters Patent.  Patented May 6, 1919.

Application filed September 23, 1918. Serial No. 255,341.

*To all whom it may concern:*

Be it known that I, CONSTANTINE D. MACROPOULOS, a subject of the King of Greece, residing in the city of New York, in the State of New York, have invented certain new and useful Improvements in Rotary Rectifiers of Alternating Currents, of which the following is a specification, reference being had to the accompanying drawings, forming a part hereof.

In Letters Patent of the United States No. 1,260,785, dated March 26, 1918, there is shown and described a rotary rectifier of alternating current which comprises a series of insulated disks in electrical connection with insulated collector rings, segmental contacts carried by the insulated disks and brushes for contact with the segmental contacts and connected with the leading-in wires, while other brushes are provided for contact with the collector rings. The present invention relates to rectifiers of the same general class and has for its object to provide a much simplified arrangement adapted for use with a three-phase, three-wire system. In the improved rectifier the contact segments carried by the rotating body are in electrical connection with each other and with the collector rings on the positive side and on the negative side, each group being insulated from the other, while there are connected to each leading in wire two brushes, one for contact with the corresponding contact segments of the positive group and the other for contact with the corresponding contact segments of the negative group. The invention will be more fully explained hereinafter with reference to the accompanying drawings in which it is illustrated and in which—

Figure 1 is a view in end elevation of the improved rectifier.

Fig. 2 is a view partly in longitudinal section and partly in side elevation on the plane indicated by the broken line 2—2 of Fig. 1, looking in the direction of the arrows.

Fig. 3 is a view in horizontal section on the plane indicated by the broken line 3—3 of Fig. 1, looking in the direction of the arrows.

Fig. 4 is a diagrammatic view illustrating the electrical relations of the several parts of the rectifier.

The improved rectifier comprises generally a base $a$ on which are supported pedestals $a'$ in which is journaled the rotating shaft $b$, which may be driven continuously and in time with the phases of the alternating current by any suitable means. On the shaft $b$ and insulated therefrom and from each other, but rotating with the shaft, are mounted the two rotary rectifier bodies $c$ and $d$, respectively positive and negative. As shown in the drawings, each rectifier body may be made up for convenience of three metal disks $c'$, $c^2$ and $c^3$ and $d'$, $d^2$ and $d^3$ respectively, and a collector ring $c^4$, $d^4$, the disks and ring of each group being in electrical connection. Each disk carries a contact segment or series of contact segments $c'^x$, $c^{2x}$, $c^{3x}$ or $d'^x$, $d^{2x}$, $d^{3x}$, which may be secured to or formed with the corresponding disks but are in electrical connection with the corresponding collector ring $c^4$ or $d^4$ as the case may be.

It will be understood that the number of contact segments on each disk or in each circumferential series and the speed of rotation of the rectifier body will be determined by the frequency of the current. In the embodiment of the invention shown in the drawings each disk or each circumferential series is shown as having three contact segments. Each contact segment represents a half cycle or 180° of a complete phase measured by 360°. Each contact segment will therefore be followed, in the positive group or in the negative group, as the case may be, by a blank. Furthermore, if the complete cycle be measured by 360°, each phase, in a three-phase system, must follow another by 120°. Therefore, in a rectifier having three contact segments, each contact segment of each series occupies one-sixth of the circumference of the rectifier body and is followed by a blank of one-sixth of the circumference in extent. Moreover, since each of the successive phases follows its predecessor by a determined portion of the complete cycle, each contact segment of each successive series of contact segments must follow the corresponding contact segment of the preceding series by a corresponding distance. Therefore, in the embodiment of the invention illustrated, each contact segment $c^{2x}$ follows the corresponding contact segment $c'^x$ by two-thirds of the length of the contact segment $c'^x$, and in like manner each contact segment $c^{3x}$ follows the corresponding contact segment $c^{2x}$ by two-thirds of the length of the contact segment $c^{2x}$. This arrangement is illustrated in the drawings.

It will be understood that the disks or series of contact segments $d'$, $d^2$, $d^3$ and the collector ring $d^4$ are mutually related, with respect to each other and to the contact segments, in the same manner as already described with respect to the disks or series of contact segments $c'$, $c^2$, $c^3$ and the collector ring $c^4$ and that, since the series of contact segments $d'$, $d^2$ $d^3$ correspond to the negative phases, each to one-half of the corresponding complete cycle, each contact segment $d'^x$, $d^{2x}$, $d^{3x}$ follows the corresponding contact segment $c'^x$, $c^{2x}$, $c^{3x}$ by the length of the latter, corresponding in position with the succeeding blank in each case. It will also be understood that the number of contact segments and the blanks of each series may vary. If the rectifier body is rotated at a sufficiently high speed each series might consist of one contact segment and one blank, but this would be impracticable on account of the high speed required. It is preferable, therefore, to provide a number of contact segments in each series, the speed of rotation being correspondingly lowered for a given frequency of alternation of the current. The contact disks and collector rings of both groups are insulated from the driving shaft $b$ by suitable insulation $e$ and the two groups are insulated from each other by suitable insulation $f$. It will further be understood that each contact segment of each series of contact segments overlaps somewhat the corresponding contact segment of the preceding series, so that the current of each phase is delivered to the contact segment and thence to the collector ring before it reaches the zero point.

The brushes $o'$, $o^2$, $o^3$ of the positive group and the brushes $n'$, $n^2$, $n^3$ of the negative group are insulated from each other and are connected to the leading in wires, the brushes $o'$ and $n'$ to the leading in wire $x$, the brushes $o^2$ and $n^2$ to the leading in wire $y$ and the brushes $o^3$ and $n^3$ to the leading in wire $z$. The brushes are supported by a swinging frame, which may be mounted on the shaft $b$. Segmental gears $p'$ at the ends of the frame are engaged by worms $p^2$ provided with hand wheels $p^3$, whereby the position of the brushes may be adjusted exactly with respect to the phases of the current. Each of the brushes may be pressed upward yieldingly toward the rotary rectifier body by a suitable leaf spring $q$, proper contact between each brush and the corresponding contact segments being thereby assured.

From the collector rings $c^4$ and $d^4$ connection is made by suitable brushes $h$ and $i$ to the legs of the circuit to which current is to be delivered.

In the operation of the rectifier each positive phase of the alternating current is transmitted from the corresponding wire and brush to the corresponding segments and thence to the collector rings, the phases overlapping, as already explained, so that the current of each phase is taken off at a point somewhat above the zero point. In like manner connection is effected between the negative collector ring and the three negative wires in like order and at a like point of the opposite or negative phase.

It will be understood that the size of the contact disks, the number of contact segments thereon and the speed of rotation will be varied in accordance with the frequency of the current. It will also be obvious that changes in details of construction and arrangement may be made to suit different conditions of use.

I claim as my invention:

1. A rotary rectifier for a three-phase, three-wire electrical system, comprising a rotary shaft, three brushes connected respectively to the positive wires, three brushes connected respectively to the negative wires, corresponding contact segments mounted to rotate with the shaft, and a collector ring in electrical connection with each group, positive and negative, of the contact segments, the contact segments and collector ring of each group being insulated from the contact segments and collector ring of the other group and the contact segments of each group for contact with the brushes of that group being arranged to follow one another in the relation of the several phases of the current.

2. A rotary rectifier for a three-phase, three-wire electrical system, comprising a rotary shaft, two rotary rectifier bodies mounted on the shaft and insulated from each other, each rectifier body having three series of contact segments and a collector ring in electrical connection with one another, the corresponding contact segments of the several series following one another in the relation of the phases of the current, a series of brushes for contact with the contact segments of each group and severally connected to the several corresponding wires, positive and negative, and a brush for co-operation with each collector ring and connected respectively to the corresponding leg of the rectified circuit.

This specification signed this 18th day of September, A. D. 1918.

CONSTANTINE D. MACROPOULOS.